United States Patent [19]

Marchioro et al.

[11] 4,319,522

[45] Mar. 16, 1982

[54] ROLLING MILL FOR ROLLING WEB-LIKE MATERIALS

[75] Inventors: Ignazio Marchioro, Schio, Italy; Wolf-Gunter Stotz, Ravensburg, Fed. Rep. of Germany

[73] Assignee: Escher Wyss Limited, Zürich, Switzerland

[21] Appl. No.: 141,479

[22] Filed: Apr. 18, 1980

[30] Foreign Application Priority Data

May 10, 1979 [CH] Switzerland ............... 4368/79

[51] Int. Cl.³ .................. B30B 3/04; B21B 13/02
[52] U.S. Cl. .................. 100/162 B; 29/116 AD; 72/245
[58] Field of Search ............... 100/162 R, 162 B; 29/113 AD, 116 R, 116 AD; 72/241, 245

[56] References Cited

U.S. PATENT DOCUMENTS

| | | | |
|---|---|---|---|
| 3,885,283 | 5/1975 | Biondetti | 29/116 AD |
| 3,921,514 | 11/1975 | Biondetti | 100/162 B |
| 4,106,405 | 8/1978 | Biondetti et al. | 29/116 AD |
| 4,107,831 | 8/1978 | Siegfried | 29/116 AD |
| 4,218,905 | 8/1980 | Lehmann et al. | 72/245 X |
| 4,222,255 | 9/1980 | Lehmann | 72/245 X |
| 4,222,324 | 9/1980 | Biondetti | 29/116 AD |

Primary Examiner—Peter Feldman
Attorney, Agent, or Firm—Werner W. Kleeman

[57] ABSTRACT

A rolling mill contains a controlled deflection roll possessing a roll shell movable, in the pressure or contact plane, radially in relation to a roll support or beam for rotatably mounting the roll shell. The ends of the roll shell are guided in appropriate guide means. The roll shell, in the pressing or contact position of the controlled deflection roll, bears against fixed stops or impact members, so that there is formed a fixed roll. A regulation device serves for determining the magnitude of the impact forces. As the impact or stop member there can be preferably used the ends of the guide means or guides of the roll shell. The impact force is formed by pressure or support elements of the controlled deflection roll or by pistons mounted at the region of the guide means. There also can be provided an external contact or pressing device.

10 Claims, 8 Drawing Figures

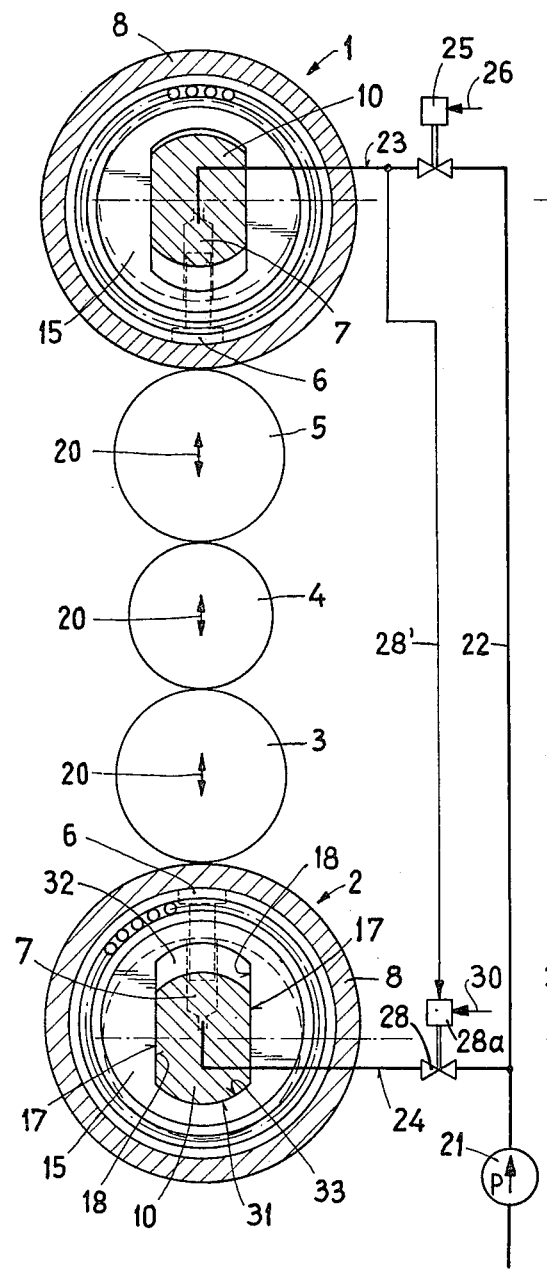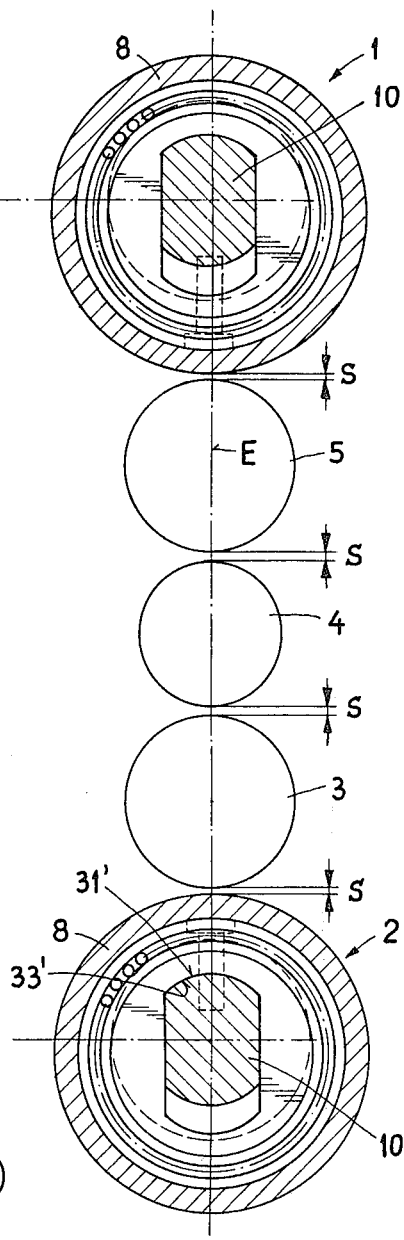

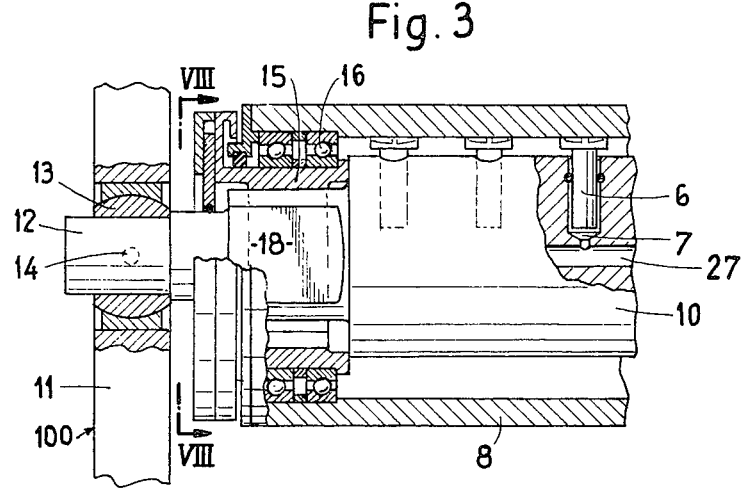
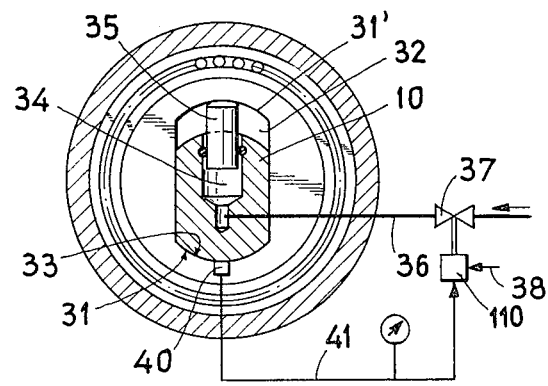
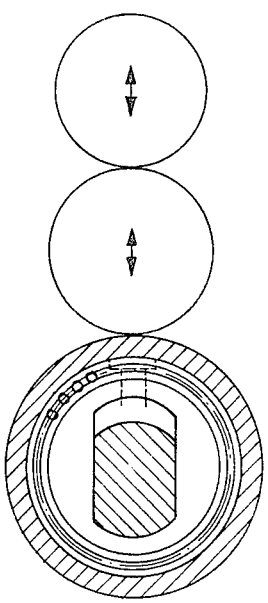
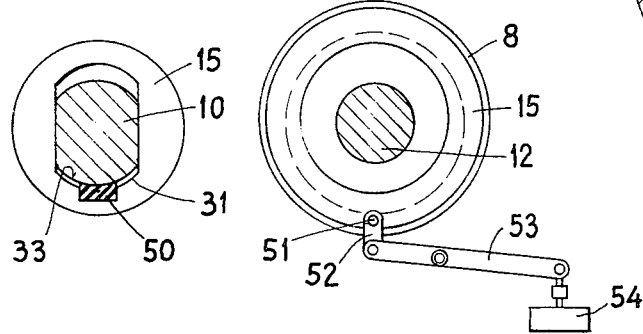

ROLLING MILL FOR ROLLING WEB-LIKE MATERIALS

BACKGROUND OF THE INVENTION

The present invention relates to a new and improved construction of a rolling mill or rolling device for rolling web-like materials.

Generally speaking, the rolling mill of the present development is of the type comprising at least one controlled deflection roll containing a roll support or beam which is secured into a frame arrangement and a roll shell which is mounted to be rotatable about the roll support or beam. The roll shell is supported upon the roll support by pressure or support elements serving to produce a pressing or contact force which is effective at a counter roll. The roll shell is movable, in relation to the roll support in the pressing or contact direction of the controlled deflection roll, in order to enable lifting movements to be carried out along its entire length.

A rolling mill or device of this type is disclosed, for instance, in German Patent Publication No. 2,651,028. The roll which is used in this rolling mill of the prior art is equipped with a movable roll support of the type disclosed in U.S. Pat. No. 3,885,283, in order to enable the performance of the lifting movements. With the equipment according to the aforementioned German Patent Publication No. 2,651,028 this roll coacts with a controlled deflection roll, the construction of which is known from U.S. Pat. No. 3,802,044. In such construction of controlled deflection roll the roll shell is not mounted to be movable in relation to the roll support or beam in the pressing direction of the controlled deflection roll, rather is mounted upon the roll support in roller bearings. Heretofore when erecting rolling mills free of bending or sag, such as, for instance calenders for the smoothing of paper webs, there were used such two types of controlled deflection rolls, wherein the one type, namely the type possessing the movable roll shell for enabling the lifting movements, served for the pressing and lifting operations, and the other type of constructed rolls served as a fixed counter roll for forming a fixed or static point.

SUMMARY OF THE INVENTION

Therefore, with the foregoing in mind it is a primary object of the present invention to provide a new and improved construction of a rolling mill for rolling web-like materials which is not associated with the aforementioned limitations and shortcomings of the prior art discussed above.

Another and more specific object of the present invention aims at providing a new and improved construction of rolling mill of the previously mentioned type, wherein a single type of roll can be used, and specifically a roll which has a movable roll shell for the performance of the lifting movements in relation to the roll support, and such type of roll also can serve as a static or fixed point for the roll arrangement or bank of rolls.

Now in order to implement these and still further objects of the invention, which will become more readily apparant as the description proceeds, the invention contemplates that the roll shell of the controlled deflection roll is supported, in the pressing or contact position, upon stops or impact members which are stationary in relation to the frame arrangement.

By virtue of these measures there is attained the beneficial result that the roll, which possesses a roll shell movable, in the pressing or contact direction, in relation to the roll support or beam, assumes the characteristics of a roll wherein, just as the case for a roll having the fixed mounting of the roll shell at the roll support or beam, the roll shell is fixed upon the roll support in the pressing or contact direction. Consequently, a single type of roll can be used in the rolling mill, so that in the case of a rolling mill having two or more controlled deflection rolls it is possible to achieve different effects inasmuch as selectively the one or the other of the rolls, by performing suitable switching operations as will be disclosed more fully hereinafter, can be converted into a fixed or stationary roll, i.e. a roll having a stationary axis of the roll shell. However, it is to be specifically understood that the inventive utilization of the roll containing a roll shell movable in the pressing or contact direction, is not limited in its field of application to the use of a controlled deflection roll as a counter roll. In similar fashion one or a number of counter rolls can be structured as conventional solid rolls, wherein one of them is then fixedly retained and can serve as a fixed or stationary roll or all of the rolls can be freely movable in a pressure plane. In this case, with a vertical arrangement thereof, they can produce the pressure or contact force due to their inherent weight, and the controlled deflection roll serves as a fixed support roll.

Preferably, the roll shell can be guided at the roll support in the pressing or contact direction with the aid of parallel guides or guide means located at the end regions of the roll shell. The stop or impact members are located at the end surfaces of such guide means as well as at the surfaces at the roll support which coact therewith. In this way there is obtained a particularly simple realization of the inventive concept, since as the stops or impact members there are beneficially employed the surfaces which are present anyway in a roll construction of the type disclosed in U.S. Pat. No. 3,885,283.

Moreover, there can be provided a special device for setting the magnitude of the impact forces, by means of which the roll shell is supported upon the stops or impact members.

For this purpose, the stops or stop means can be equipped with force measuring devices, serving for measuring the magnitude of the impact forces, by means of which the roll shell is supported upon the stops.

A particular advantage is realized if the impact forces at the roll shell are effective in the same direction as the pressure or contact forces of the pressure or support elements. In this instance there is available for opening of the rolling mill the largest possible stroke of the roll shell. It should be specifically understood, however, that the impact forces also can be effective in the opposite direction. In this instance, in the case of a roll having parallel guides, the roll shell bears upon the opposite ends of the guides.

Preferably, the counter roll or, as the case may be, one of a number of counter rolls, likewise may be constituted by a controlled deflection roll provided with a roll shell which is rotatable in relation to a fixed support or beam and simultaneously movable over its entire length in order to perform lifting or elevational movements in the pressing direction. In this instance, the equipment contains two similar controlled deflection rolls which press against one another and wherein one of them is utilized as a fixed or stationary roll.

In order to form the impact force it is possible to provide piston-and-cylinder devices or units which are located at the region of the guides at the end of the roll shell. With such arrangement the impact forces are not effective at the ends of the roll shell and do not influence its bending or sag.

However, there also can be provided pressure or support elements between the roll support and the roll shell, which serve for producing the impact force. Here, the pressure or support elements, serving for the generation of the impact force, simultaneously are used for forming the pressing or contact force, and their force is increased beyond the value needed for exerting the pressing force to a value required for forming the impact force. Consequently, there is again obtained a particularly simple construction of the equipment, since for producing the impact force there are not required within the confines of the roll any additional elements.

The inventive apparatus also can constitute a calender for smoothing paper webs. However, it is to be specifically understood that also other constructional embodiments are conceivable in order to process other web-like or sheet-like materials, such as, by way of example and not limitation, textiles, plastics or metals.

Preferably, the pressure or support elements can be hydrostatic pressure or support elements for hydrostatically mounting or supporting the roll shell, in the manner disclosed in the aforementioned U.S. Pat. Nos. 3,802,044 and 3,885,283.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically illustrates a rolling device or mill according to the invention showing the rolls in their pressing or contact position;

FIG. 2 illustrates the rolling mill of FIG. 1 in its open position;

FIG. 3 is a schematic fragmentary sectional view of one of the ends of the controlled deflection rolls of the rolling mill shown in FIGS. 1 and 2, and specifically in a position corresponding to the lower roll of the arrangement of FIG. 2;

FIG. 4 is a sectional view of a different embodiment of roll, corresponding to the sectional showing of FIG. 1;

FIG. 5 is a sectional view through a rolling mill, corresponding to the illustration of FIGS. 1 and 2, wherein here there are provided only one controlled deflection roll and two rolls which are freely movable in the pressing or contact direction;

FIG. 7 is a sectional view, corresponding to the lower roll of the arrangement of FIG. 1, of a further embodiment of roll according to the invention; and FIG. 8 is an end view of a different embodiment of roll, which during operation, is intended to serve as a fixed or static roll.

DETAILED DESCRIPTION OF THE PREFERRED EMBODIMENTS

Figure 6:
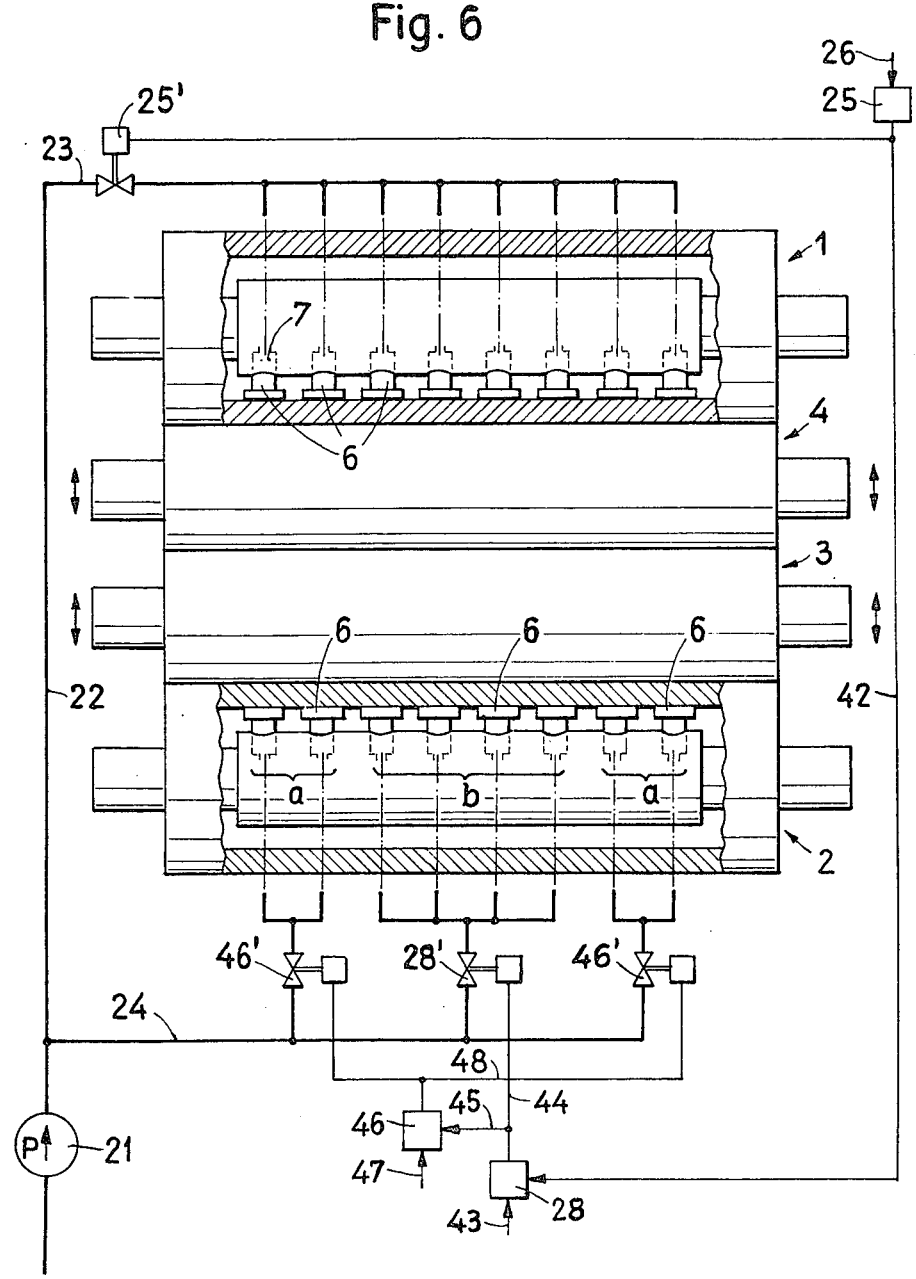
FIG. 6 is a switching circuit diagram of a rolling mill containing two controlled deflection rolls and two solid rolls.

Describing now the drawings, it is to be understood that only enough of the construction of the rolling mill or device, designed according to the teachings of the invention, has been shown in the drawings to simplify the illustration and for clarity thereof, as is needed for one skilled in the art to readily understand the underlying principles and concepts of the invention. Turning attention now to FIGS. 1, 2 and 3, there is illustrated therein, by way of example and not limitation, a rolling mill constructed according to the invention, which contains an upper controlled deflection roll 1, a lower controlled deflection roll 2 and intermediate rolls 3, 4 and 5. Both of the rolls or rollers 1 and 2 are controlled deflection rolls, which may be of the type disclosed in the aforementioned U.S. Pat. No. 3,885,283, to which reference may be readily had and the disclosure of which is incorporated herein by reference.

These rolls 1 and 2 contain hydrostatic pressure or support elements 6, here shown as pressure or support pistons, indicated in broken lines. By means of a suitable hydraulic pressurized fluid medium, typically for instance oil, which is effective in the cylinder chambers or compartments 7, these pressure or support pistons 6 are pressed against the not particularly referenced inner surface of the related roll shell 8. As has been disclosed in the equally previously referred to U.S. Pat. No. 3,802,044, each of the pressure or support pistons 6 can be provided with a hydrostatic bearing or contact surface opposite the roll shell 8.

Each of the controlled deflection rolls 1 and 2 contains a roll support or beam 10, which, as best seen by referring to FIG. 3, is pivotable, but however secured against rotation at its ends in side elements 11 of a frame arrangement or frame means or equivalent structure, generally indicated by reference character 100.

As also best seen by referring to FIG. 3, the ends 12 of the roll support or beam 10 are provided for the aforementioned purpose with a respective spherical bearing or support element 13. At its one end the roll support 10 is secured against rotation in the related side element or portion 11 by a pin 14 or equivalent structure.

As also will be seen by referring to FIG. 3, at the ends of the roll shell 8 there are arranged guide elements or guide means 15, upon which the roll shell 8 is mounted in roller bearings 16 or other anti-friction bearing means or equivalent structure. The guide elements or guide means 15 are provided with substantially parallel guide surfaces 17, which coact with appropriate parallel guide surfaces 18 of the roll support 10 and form therewith this parallel guide arrangement or guide means. The parallel guides or guide means 17, 18 of the rolls 1 and 2 are arranged such that they enable movements of the roll shell 8 in the pressing direction of the rolls, these movements extending in a press or contact plane E, as best seen by reverting to FIG. 2. As indicated by the double-headed arrows 20 of FIG. 1, also the intermediate rolls 3, 4 and 5 are freely movable, in this press or contact plane E, through a certain limited degree which is governed by not particularly illustrated, but conventional stops or impact members.

As further schematically shown in FIG. 1, the hydrostatic pressure or support elements 6 of the rolls 1 and 2 are supplied with the pressurized fluid medium by means of a hydraulic pump installation or unit 21 having feed or delivery line means 22 from which branch off the branch lines or conduits 23 and 24 leading to the rolls 1 and 2, respectively. In the branch line or conduit 23 there is arranged a regulation valve 25 or equivalent structure, which reduces the pressure of the hydraulic pressurized fluid medium emanating from the line or conduit 22 to a value which is governed by a reference value, generally indicated by the arrow bearing reference character 26. The thus obtained pressure, effective in the branch line or conduit 23, in the embodiment under discussion, is applied to all of the cylinder chambers or bores 7, and in a comparable manner the branch line or conduit 24 leads to all of the cylinder chambers or bores 7 of the pressure or support pistons 6 of the roll 2. The distribution of the pressurized fluid medium can be accomplished, for instance, by means of a bore or channel 27 provided at the roll support 10, as the same has been illustrated in FIG. 3 and is well known in this technology.

The branch line or conduit 24 is provided with a pressure regulating valve 28 which contains a suitable pressure differential regulator, generally indicated by reference character 28a. The pressure differential regulator 28a of the pressure regulating valve 28 has infed thereto, by means of a signal line 28', a signal which corresponds to the pressure prevailing in the line or conduit 23. At the same time the pressure differential regulator 28a receives a reference value signal 30, which determines the prevailing pressure differential, by means of which, in this case, the pressure in the line or conduit 24 should be greater than the pressure prevailing in the line or conduit 23. The pressure differential governed by the reference value 30 serves for compensating the inherent weight of the movable parts of the rolls 1 and 2 and the intermediate rolls 3, 4 and 5, and also for determining the impact forces, by means of which, in the arrangement of FIG. 1, the end surface 31 of the guide opening 32 of the guide element or part 15 presses against the corresponding surface 33 of the roll support 10.

Any loading of the rolling mill, by influencing the reference value 26, acts equally at both rolls 1 and 2, wherein, however, the counter force formed by the lower roll 2 is greater by the value which is governed by the reference value 30. The roll shell 8 is therefore fixed by the mutually supported surfaces 31 and 33, so that the roll 2 functions in the manner of a fixed or immobile roll which is not movable in the pressing or contact direction.

Since in the embodiment of FIGS. 1 and 2 the impact forces are effective upon the roll shell 8 in the same direction as the pressure or pressing forces of the pressure or support elements 6, i.e. act upwardly, there is available for the opening of the roller mill the entire length of the parallel guide arrangement or guide means 17, 18. As best seen by reverting to FIG. 2, the roll shell 8 of the lower controlled deflection roll 2 can be lowered to such an extent until the end surfaces 31' and 33' come to bear against one another at the other end of the parallel guide arrangement or guide means 17, 18. As a result, there prevails a gap S between the roll shells 8 of the controlled deflection rolls 1 and 2 and the related intermediate rolls 3, 4 and 5. This gap S is governed by not particularly illustrated stops or impact members provided at the mounting or support means of the intermediate rolls 3, 4 and 5.

According to the showing of FIGS. 1 and 2, the impact forces of the roll 2 is constituted by an excess force of all of the pressure or support elements 6 of the roll 2. On the other hand, with the embodiment of FIG. 4, the contact force, by means of which the surfaces 31 and 33 are pressed against one another, is produced by a piston-and-cylinder arrangement or until 34, 35. This piston-and-cylinder unit 34, 35 contains a piston 35 guided in a cylindrical bore or chamber 34 of the roll support or beam 10. The cylinder 34 is connected by means of a branch line or conduit 36, containing a pressure regulating valve 37, with the feed or conveying line 22 of the supply device or supply means 21. The pressure regulating valve 37 determines, as a function of a reference value signal 38, the pressure prevailing in the line or conduit 36, and thus, the pressure force by means of which the piston 35 is pressed against the end surface 31' of the guide opening 32, and thus, also the pressure force by means of which the surfaces 31 and 33 are pressed against one another.

According to the showing of FIG. 4, the surface 31 is also provided with a force or power measuring device 40, from which there leads a signal line 41 to the regulator 110 of the pressure regulating valve 37. This regulator 110 then regulates the pressure prevailing in the branch line or conduit 36, with the aid of its conventional regulating valve, such that the impact force, acting upon the force measuring device 40, corresponds to the desired reference value 38.

Now in FIG. 6 there is shown in markedly schematic simplified illustration a roller or rolling mill, wherein not all of the pressure or support elements 6 are employed for forming the impact forces, rather only groups of pressure or support elements 6 located at the end regions of the related rolls. In this arrangement the same elements corresponding to those discussed above with respect to FIGS. 1 and 3 have been conveniently designated with the same reference characters in the showing of FIG. 6.

The rolling mill of FIG. 6, contains apart from both of the controlled deflection rolls 1 and 2, only two intermediate rolls 3 and 4. The pressure or support elements 6 of the roll 1 are impinged, in the same manner as described above with respect to the embodiment of FIGS. 1 and 2, with the same pressure of the pressurized fluid medium effluxing from the branch line or conduit 23. For reasons of simplification in the illustration of the drawing of FIG. 6, here the valve element or component 25' of the pressure regulating valve 25 has been separately shown.

With the embodiment of FIG. 6 a signal line 42 leads from the pressure regulator 25 to the pressure regulator 28, which has applied thereto a reference value 43. An output line 44 leads from the pressure regulator 28 to the valve 28'. Branched-off of the signal line or conductor 44 is a signal line 45, leading to a regulator 46, this regulator 46 having infed thereto a reference value 47. An output line or conductor 48 leads from the regulator 46 to two valves 46'.

As readily apparent from the lower portion of the showing of FIG. 6, the regulator 46 together with the valves 46' controlled thereby, influences groups a of pressure or support elements 6 located at the end region of the roll 2, these pressure or support elements 6 being constituted by pressure or support pistons as previously discussed. On the other hand, the regulator 28 together with the valve 28' influences the remainder of the pressure or support elements 6, i.e. the group b of pressure pistons 6 located at the central region of the roll 2.

In the embodiment of FIG. 6, both of the regulators 28 and 46 are so-called pressure differential regulators. They influence their valves 28' and 46', respectively, such that the pressure prevailing in the related lines or conduits, in each case, is greater than the value infed by the signal lines 42 and 45, respectively, by an amount which is governed by one of the reference values 43 and 47, respectively. The reference value signal 43 is assigned the task of compensating the inherent weight of the movable parts of the rolls 1 and 2 as well as the rolls 3 and 4. In addition thereto the reference value 47 is responsible for the formation of the impact forces at the end regions of the roll 2. For forming these impact forces there are not thus employed in this case all of the pressure or support elements 6, rather only those of the pressure element group a.

FIG. 7 illustrates a detail of the roll 2 shown in FIG. 1, wherein the end surface 31 is provided with a buffer or dampening device 50 formed of an elastic material, against which acts the surface 33 of the roll support 10. Hence, instead of using a hard metallic stop or impact element there is provided a resilient stop or impact arrangement.

FIG. 8 shows an embodiment, wherein for the purpose of forming the impact forces, there is beneficially utilized an external mechanism working with weight loading.

In the showing of FIG. 8, which essentially corresponds to the sectional view of FIG. 3 taken along the line VIII—VIII thereof, there is supported at the guide element 15, by means of a pin 51 or equivalent structure, a bracket 52. This bracket 52 is loaded by a double-arm lever 53 through the action of a weight 54 or the like. This weight 54 is dimensioned such that it presses together, with a desired contact or pressing force, the surfaces 31 and 33.

It should be understood that the embodiments illustrated in the drawings and described herein, are only presented as exemplary for the purpose of explaining the invention and are not to be construed in any way as limiting the permissible scope of the inventive concepts, as many different modifications will suggest themselves to those skilled in the art. Thus, for instance, it would be possible to provide for the controlled deflection rolls pressure or support elements of a different type than those disclosed in the aforementioned U.S. Pat. No. 3,802,044. The controlled deflection rolls can be provided in conventional manner with a number of groups of pressure or support elements, which can be controlled independently of one another as is equally known in this field. In this case the hydraulic circuit arrangement of FIG. 1 would be separately provided for each group.

With the embodiment of FIG. 8 there can be used, in lieu of the weight 54, also a hydraulic or pneumatic cylinder.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A rolling mill for rolling substantially web-shaped materials and containing a plurality of rolls, comprising:
   frame means;
   one of said plurality of rolls being a controlled deflection roll comprising:
   a roll support secured in said frame means;
   a roll shell rotatable about said roll support;
   pressure elements for exerting a pressure force effective upon a counter roll; said pressure elements supporting said roll shell upon said roll support;
   means for movably mounting the roll shell for performing lifting movements, in a pressing direction of the controlled deflection roll, along its entire length 1in relation to the roll support; and
   impact means which are stationary with respect to said frame means in order to support the roll shell of the controlled deflection roll in the pressing position and to transform said controlled deflection roll into a fixed roll defining a static point with respect to the remainder of said plurality of rolls.

2. The rolling mill as defined in claim 1, further including:
   parallel guide means located at end regions of said roll shell for guiding said roll shell upon said roll support in the pressing direction; and said impact means being located at end surfaces of said guide means and at surfaces of said roll support which coact with said guide means.

3. The rolling mill as defined in claim 1, further including:
   means for setting the magnitude of the impact forces by means of which the roll shell is supported at said impact means.

4. The rolling mill as defined in claim 3, further including:
   force measuring means provided for said impact means; and
   said force measuring means serving to measure the magnitude of the impact forces with which the roll shell bears against said impact means.

5. The rolling mill as defined in claim 3, wherein:
   said impact forces act upon said roll shell in the same direction as the pressing forces of the pressure elements.

6. The rolling mill as defined in claim 1, further including:
   at least one counter roll;
   said at least one counter roll comprising:
   a controlled deflection roll containing a roll shell movable in the pressing direction; and
   said roll shell of said controlled deflection roll defining said counter roll being rotatable about a fixed support and simultaneously movable throughout its full length for the performance of lifting motions in the pressing direction.

7. The rolling mill as defined in claim 2, further including:
   piston-and-cylinder means for forming an impact force; and
   said piston-and-cylinder means being located at the region of said guide means at the ends of said roll shell.

8. The rolling mill as defined in claim 1, wherein:
   said pressure elements of said controlled deflection roll comprise pressure-exerting members arranged between said roll support and said roll shell and which serve for forming an impact force.

9. The rolling mill as defined in claim 8, wherein:
   said pressure elements serving for forming said impact force simultaneously serve for forming a pressing force; and
   the force of the pressure elements being greater than a value serving for exerting the pressure force by an amount corresponding to the value needed for forming the impact force.

10. The rolling mill as defined in claim 1, wherein:
    said rolling mill comprises calender means for smoothing paper webs.

\* \* \* \* \*